US008222168B2

(12) United States Patent
Hertzog et al.

(10) Patent No.: US 8,222,168 B2
(45) Date of Patent: Jul. 17, 2012

(54) PRINTING BLANKET FOR MOUNTING ON A ROTATING SUPPORTING CYLINDER OF A PRINTING MACHINE

(75) Inventors: Denis Hertzog, Berrwiller (FR); Lionel Cardoso, Aspach le Bas (FR); Laurent Bertapelle, Wittelsheim (FR)

(73) Assignee: Trelleborg Coated Systems US, Spartanburg, SC (US)

( * ) Notice: Subject to any disclaimer, the term of this patent is extended or adjusted under 35 U.S.C. 154(b) by 983 days.

(21) Appl. No.: 11/911,969

(22) PCT Filed: Apr. 21, 2006

(86) PCT No.: PCT/FR2006/000888

§ 371 (c)(1),
(2), (4) Date: Apr. 1, 2008

(87) PCT Pub. No.: WO2006/111663

PCT Pub. Date: Oct. 26, 2006

(65) Prior Publication Data

US 2008/0213530 A1 Sep. 4, 2008

(30) Foreign Application Priority Data

Apr. 22, 2005 (FR) ..................................... 05 04063

(51) Int. Cl.

| | |
|---|---|
| ***B32B 3/02*** | (2006.01) |
| ***B32B 3/06*** | (2006.01) |
| ***B32B 5/26*** | (2006.01) |
| ***B32B 23/02*** | (2006.01) |
| ***B32B 27/12*** | (2006.01) |

(52) U.S. Cl. ........ 442/261; 442/255; 442/268; 442/286; 428/190; 428/193; 428/909

(58) Field of Classification Search .................. 428/909; 442/239, 255, 261, 268, 286
See application file for complete search history.

(56) References Cited

U.S. PATENT DOCUMENTS

| | | | | |
|---|---|---|---|---|
| 4,537,129 | A | 8/1985 | Heinemann et al. | |
| 5,749,298 | A * | 5/1998 | Castelli et al. ............. | 101/415.1 |
| 6,530,321 | B2 * | 3/2003 | Andrew et al. ............... | 101/376 |
| 6,645,601 | B1 | 11/2003 | Serain et al. | |
| 7,238,257 | B2 | 7/2007 | Risquez et al. | |
| 2001/0032560 | A1 | 10/2001 | Andrew et al. | |
| 2003/0124926 | A1 | 7/2003 | Moscato et al. | |

FOREIGN PATENT DOCUMENTS

| | | |
|---|---|---|
| FR | 2 809 665 | 7/2001 |
| FR | 2 809 667 | 7/2001 |

* cited by examiner

*Primary Examiner* — Jenna Johnson
(74) *Attorney, Agent, or Firm* — Clements Bernard PLLC; Gregory N. Clements

(57) ABSTRACT

The invention relates to a printing blanket for mounting on a rotating supporting cylinder of a printing machine. The printing blanket is in the form of a sheet whose ends are configured as leading edges and trailing edges that are adapted for being engaged in an axial fixing gap of the supporting cylinder. The blanket is characterized in that it has a multilayer structure consisting of film and reinforcing fibers. The invention can be used in the area of the printing machines.

13 Claims, 4 Drawing Sheets

PRINTING BLANKET FOR MOUNTING ON A ROTATING SUPPORTING CYLINDER OF A PRINTING MACHINE

FIELD OF THE INVENTION

The invention relates to a printing blanket for mounting on a rotating supporting cylinder of a printing machine, which is in the form of a sheet whose edges, configured in the form of a leading edge and a trailing edge, are configured for being engaged in an axial fixing gap of the supporting cylinder.

There are already known blankets of this type that have a steel band covered with an elastomer composite and bent at the two ends as preparation for mounting on the supporting cylinder. These blankets have numerous disadvantages such as the high cost because of their delicate manufacture uniting a steel band with an elastomeric composite, adhesion difficulties and fragility of the elastomer-steel bond, delicate handling since the steel tends to become indented with formation of folds, limitations as to the size of the products due to limitations of the width of the rolling mills and difficulties with elimination and recycling at the end of the service life with separation of the layers. Furthermore, the steel band has proven to be mechanically aggressive towards the cylinder of the machine, which requires protection, for example, by a polyester film, and consequently, additional operations and costs.

The invention aims to propose a blanket of the type defined above which remedies the disadvantages just set forth.

SUMMARY OF THE INVENTION

In order to attain this goal, a blanket according to the invention is characterized by the fact that it has a multilayer structure consisting of film and reinforcing fibers.

According to one characteristic of the invention, the edge part used as means for attaching the supporting cylinder in the gap is a film of polyester or polycarbonate type or equivalent associated with a unidirectional reinforcement of aramid or polyethylene type embedded in a matrix of polymers or polymers reinforced by fibers.

According to another characteristic of the invention, the part intended for use as attachment means is formed by a film of polyester or polycarbonate type associated with a reinforcement of woven or non-woven type with polyester or aramid or polyamide or polyethylene fibers, or made of metal embedded in a polymer matrix.

According to yet another characteristic of the invention, the fixation part of the blanket is formed by an association of two films of identical or different nature having an intermediate layer made of polymer, forming an encasing structure.

According to yet another characteristic of the invention, the fixation part of the blanket is formed by an association of two films of identical or different nature having an intermediate layer made of polymer associated with unidirectional reinforcements of aramid or polyethylene or which are reinforced by fibers.

According to yet another characteristic of the invention, the fixation part of the blanket is formed by an association of two films with a compressible intermediate layer, forming an encasing structure.

According to yet another characteristic of the invention, the fixation part of the blanket is formed by an association of two films with a compressible intermediate layer associated with unidirectional reinforcements of aramid or polyethylene type, forming an encasing structure.

BRIEF DESCRIPTION OF THE DRAWINGS

The invention will be better understood and other aims, characteristics, details and advantages of it will appear more clearly in the course of the following explanatory description in reference to the appended diagrammatic drawings, given only as an example, illustrating a number of embodiments of the invention, and in which.

DETAILED DESCRIPTION

Figure 1:
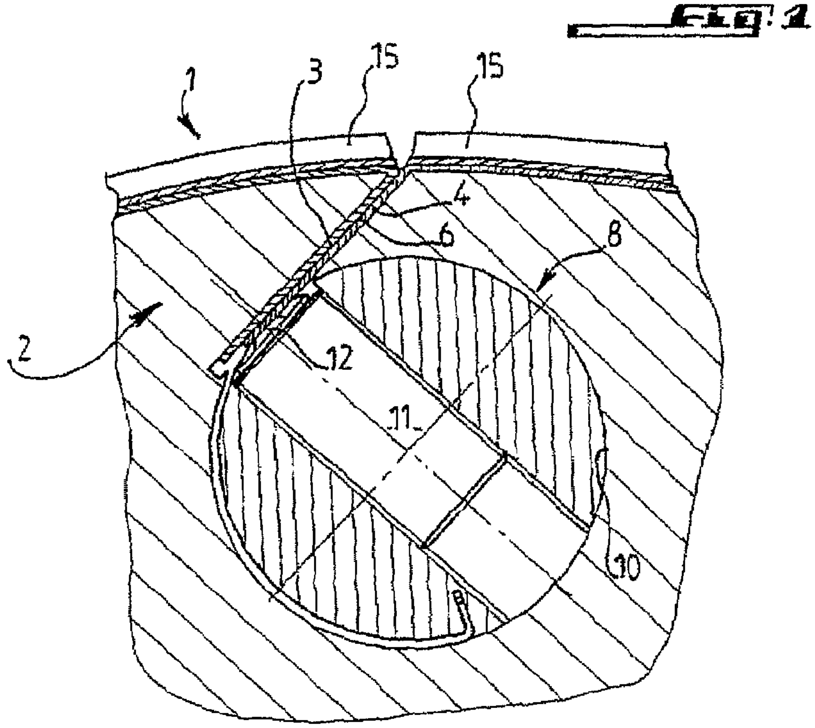
FIG. 1 is a torn away sectional view of a blanket mounted on a supporting cylinder.

As shown in FIG. 1, the invention relates to a blanket designated by reference number 1 which is mounted on supporting cylinder 2 in a known manner by engagement of its ends, configured in the form of leading edge 3 and trailing edge 4, in axial gap 6 made in cylinder 2. The leading and trailing edges are attached in this gap 6 by means of device 8 whose general structure is known and therefore does not need to be described in more detail. It is sufficient to indicate for comprehension of the invention that this device entails rotating cylindrical component 9 placed in cavity 10 of complementary shape in cylinder 2, which opens at its periphery into gap 6 such that in the angular position of component 9 represented in FIG. 1, pressing element 11, which is radially movable in cavity 10 of component 9, can be brought to its represented position in which its exterior end 12 ensures the securing of the leading and trailing edges of the blanket in gap 6 by pressing its ends against the opposite internal surface of gap 6.

Figure 2:
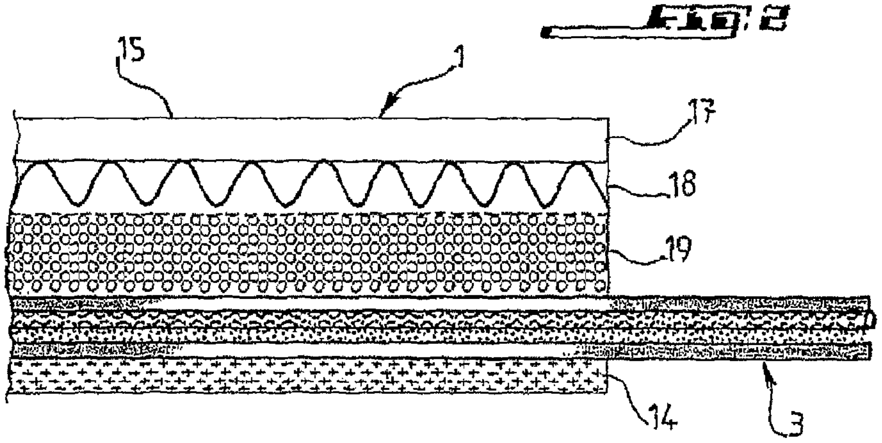
FIGS. 2 and 3 illustrate two methods of configuration of a blanket according to the invention.
Figure 3:
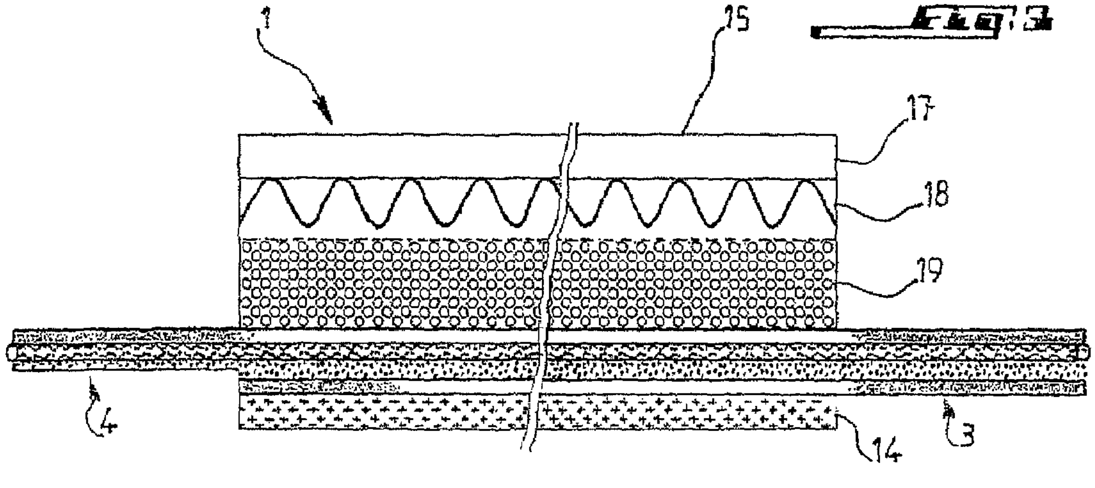

As seen specifically in FIGS. 2 and 3, a blanket according to the invention has a multilayer structure which is thinned at its ends in order to form leading edge 3 and trailing edge 4, the parts not thinned then constituting the printing part of the blanket, which is designated by reference 15. The blanket is obtained by cutting a sheet, having the multilayer structure shown as 15 in FIGS. 2 and 13, to the desired format and by suitable processing of the ends for the formation of leading edge 3 and trailing edge 4.

As confirmed by FIGS. 4 to 12 illustrating several embodiments of a blanket according to the invention, it is observed that portion 15, above the layers constituting at their ends the leading and trailing edges, has upper exterior printing layer 17, fabric layer 18 and compressible layer 19. FIGS. 2 and 3 show that protective layer 14 can be added on the side opposite from the printing surface, under the layers of the leading and trailing edges, for mechanically protecting the cylinder of the machine and the fixing layers, and if necessary, for filling in the space. Protective layer 14 can if necessary be made compressible in order to increase the shock absorbing capability of blanket 1. Protective layer 14 could be eliminated at leading edge 3 and trailing edge 4.

The leading and trailing edges could have the same thickness and the same structure, according to FIG. 2, but it could be advantageous to provide a dissymmetry between the geometries of leading edge 3 and trailing edge 4. Given that leading edge 3 is in principle stressed to a greater degree, it could be thicker or reinforced by any known means in comparison with trailing edge 4 which could be thinned, making it possible to further reduce the zone of gap 6 and that generates vibrations.

The multilayer structure of the blanket is fabricated according to traditional technologies based on thermally crosslinked elastomers or based on polymers with associated processes as described in the French Patent Applications No. 2 809 667 and 2 809 665.

A blanket according to the invention has at least a printing layer, a compressible layer and a base intended for fixing the blanket on the cylinder and which is formed by the association of a layer of film with at least either a second film, attached by the intermediary of a polymer layer, or a reinforcement embedded in a polymer matrix for the purpose of obtaining an encasing structure or a pliable composite structure with plastic behavior and shape memory. Rolling or extrusion process and then processes for assembly of the different layers will advantageously be used for manufacturing the sheet.

A certain number of exemplary embodiments of the multilayer structure of a blanket according to the invention will be specifically described hereafter with reference to FIGS. 4 to 14.

Figure 4:
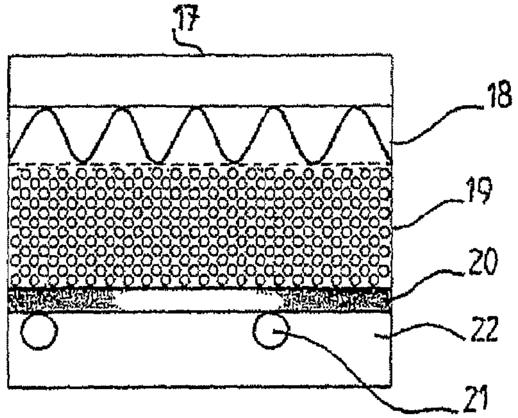
FIGS. 4 to 14 are views in section schematically illustrating a number of embodiments of a blanket according to the invention.

In the example represented in FIG. 4, the multilayer blanket has, successively from the exterior to the interior, exterior printing layer 17, fabric layer 18, compressible layer 19, film 20 of the polyester or polycarbonate type, unidirectional reinforcement 21 of the aramid or polyethylene type embedded in a layer forming a filler matrix made of polymer, with it being possible for this layer to be produced out of a grindable material so that its free internal surface 22, intended for contact with the peripheral surface of supporting cylinder 2, can be ground after formation of the multilayer structure in order to equalize the thickness of the multilayer sheet, which will then be cut to the desired format.

Figure 5:
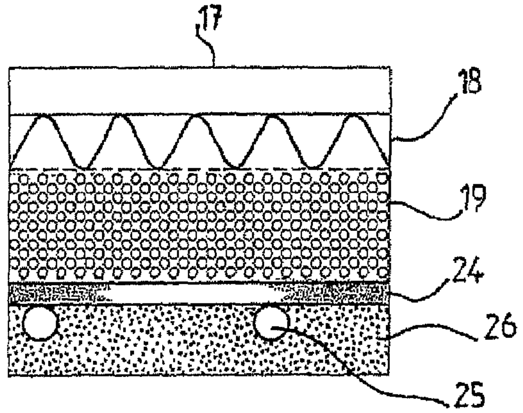

In the example according to FIG. 5, the blanket has, successively from the exterior to the interior, as in the case of FIG. 4, exterior printing layer 17, fabric 18 and compressible layer 19, and then film 24 of the polyester or polycarbonate type and unidirectional reinforcement 25 of the aramid or polyester type embedded in filler layer 26 made of expanded polymer and/or polymer that contains fibers, with the internal surface being grindable.

Figure 6:
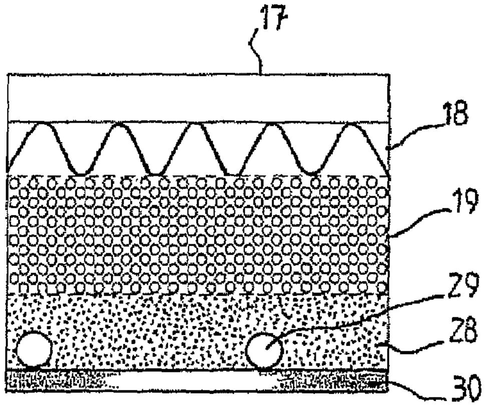

In the example shown in FIG. 6, the blanket has, as in the first cases, exterior printing layer 17, fabric 18 and compressible layer 19, and then unidirectional reinforcement 29 of aramid or polyester type embedded in filler layer 28 made of expanded polymer and/or polymer containing fibers, and finally film 30 of polyester or polycarbonate type.

Figure 7:
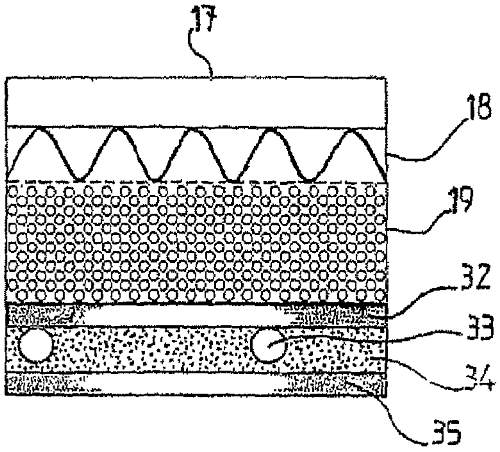

FIG. 7 shows an embodiment example of blanket 1 which successively comprises printing layer 17, fabric layer 18, compressible layer 19, film 32 of type 1 polyester or polycarbonate, unidirectional reinforcement 33 of aramid or polyester type embedded in filler layer 34 made of expanded polymer and/or polymer that contains fibers, and a film 35 of type 2 polyester or polycarbonate.

Figure 8:
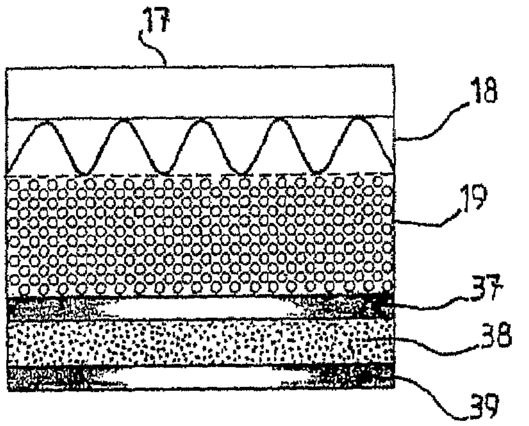

The embodiment example of the blanket according to the invention shown in FIG. 8 comprises, after printing layer 17, fabric layer 18 and compressible layer 19, film 37 of type 1 polyester or polycarbonate, filler 38 made of expanded or non-expanded polymer and containing fibers, and film 39 of type 2 polyester or polycarbonate.

Figure 9:
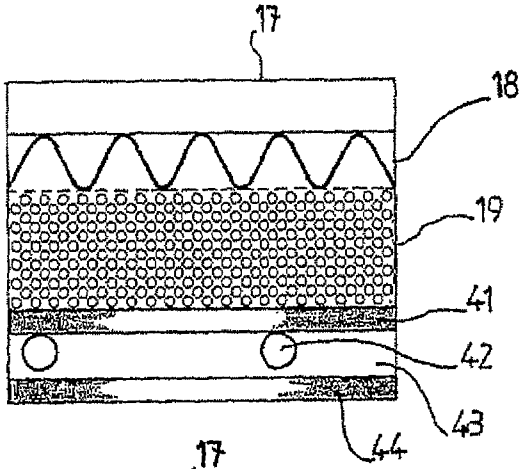

In the example according to FIG. 9, the blanket has printing layer 17, fabric 18, compressible layer 19, film 41 of type 1 polyester or polycarbonate, unidirectional reinforcement 42 of the aramid or polyester type embedded in filler layer 43 made of polymer, as well as film 44 of type 2 polyester or polycarbonate.

Figure 10:
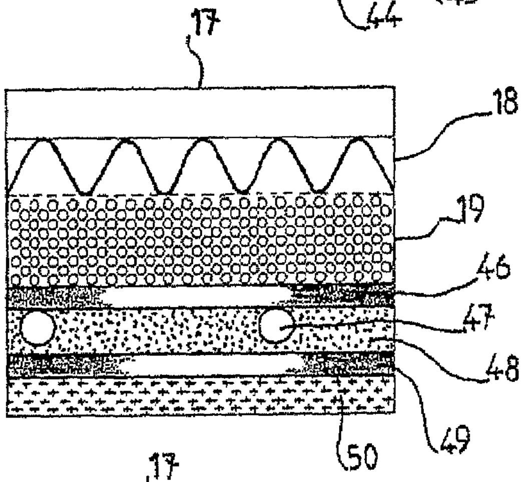

The example represented in FIG. 10, like the examples above, has exterior printing layer 17, fabric 18 and compressible layer 19 and then, specific to this example, film 46 of type 1 polyester or polycarbonate, unidirectional reinforcement 47 of the aramid or polyester type embedded in filler layer 48 made of expanded or non-expanded polymer and/or of polymer that contains fibers, film 49 of type 2 polyester or polycarbonate, and filler layer 50 made of expanded or non-expanded polymer.

Figure 11:
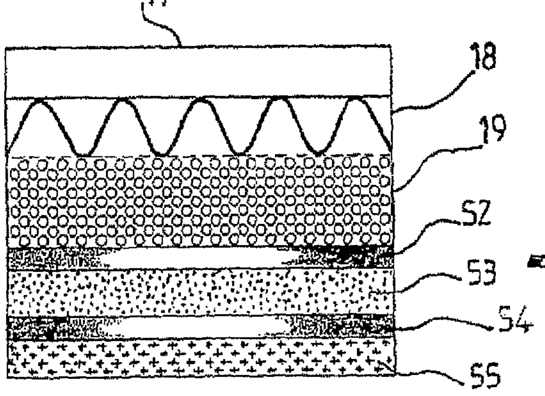

FIG. 11 shows an example which, like those mentioned above, has on the exterior printing layer 17, fabric 18 and compressible layer 19, and then film 52 of type 1 polyester or polycarbonate, filler layer 53 made of expanded or non-expanded polymer and containing fibers, film 54 of type 2 polyester or polycarbonate and filler layer 55 made of expanded or non-expanded polymer, with this polymer being grindable so that its internal surface can be ground to provide a uniform thickness of the blanket.

Figure 12:
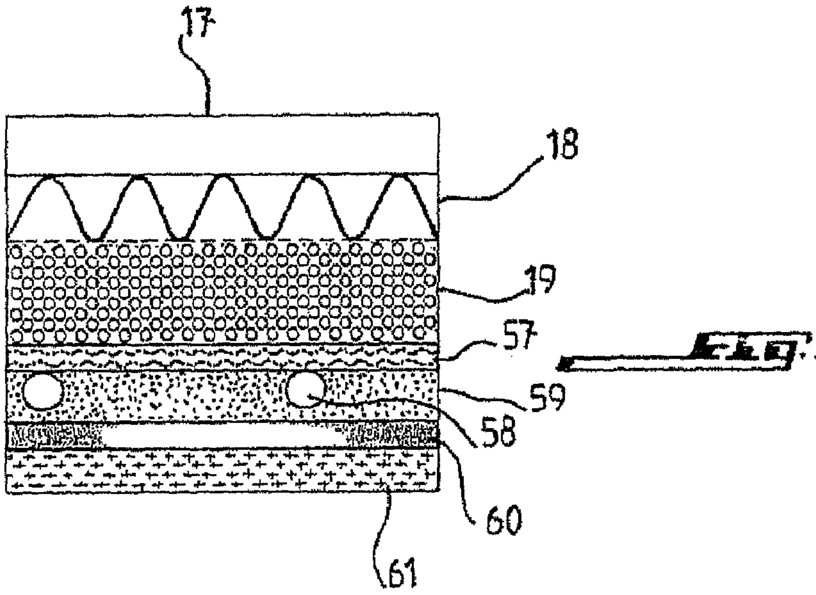

FIG. 12 presents yet another example of a blanket according to the invention which has exterior printing layer 17, fabric 18, compressible layer 19, layer 57 of type 1 unidirectional reinforcement made of aramid or polyester, etc., arranged perpendicularly to the type 2 unidirectional reinforcement, type 2 unidirectional reinforcement 58 made of aramid or polyester, and filler layer 59 made of expanded or non-expanded polymer and/or polymer that contains fibers, film 60 of polyester or polycarbonate type, and filler layer 61 made of expanded or non-expanded polymer and whose free surface is optionally ground.

Figure 13:
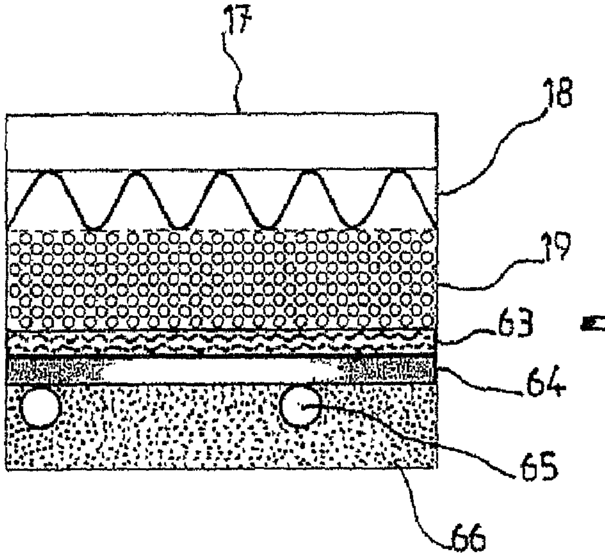

FIG. 13 shows yet another example of a blanket according to the invention which, after the three layers consisting of exterior printing layer 17, fabric layer 18 and compressible layer 19, specifically has unidirectional reinforcement 63 made of type 1 aramid or polyester, etc., arranged perpendicularly to the type 2 unidirectional reinforcement, film 64 of the polyester or polycarbonate type, type 2 unidirectional reinforcement 65 made of aramid or polyester, and filler layer 66 made of expanded or non-expanded polymer and/or polymer that contains fibers, whose free surface can be ground.

Figure 14:
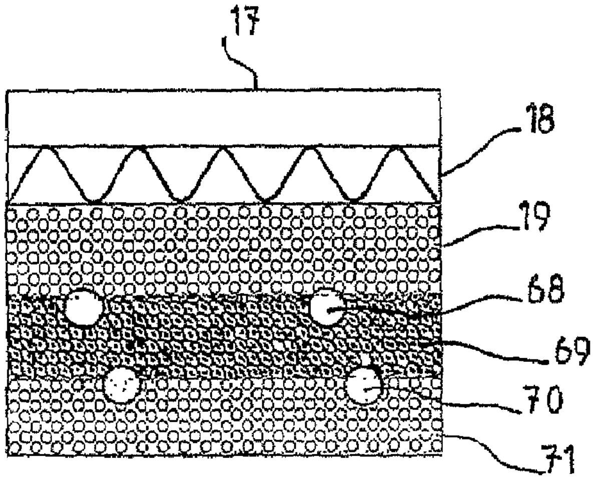

Finally, FIG. 14 illustrates an example of a blanket according to the invention which, under the printing part formed by printing layer 17, fabric 18 and compressible layer 19, has type 1 unidirectional reinforcement made of aramid or polyester, bearing reference number 68, integrated in filler layer 69 made of expanded or non-expanded polymer and/or polymer that contains fibers, type 2 reinforcement 70 made of aramid or polyester embedded in filler layer 71 made of expanded or non-expanded polymer and/or polymer that contains fibers, with it the free surface of this last layer being able to be ground in optional fashion.

It emerges from the descriptions of the numerous embodiment examples of a blanket according to the invention that the function fulfilled in the known blankets by a simple band is fulfilled in the invention by a multilayer structure based on films and fibrous reinforcements, enabling one to eliminate the problems inherent in the blankets used up to now. With regard to the multilayer structure, it has moreover proven to be the case that a known simple film with a thickness similar to the known metal band would not constitute a satisfactory solution to the problem which is at the basis of the invention, because of insufficient mechanical strength on the one hand and on the other hand because of the absence of shape memory, which makes mounting delicate if not impossible in practice. With regard to mechanical strength, a blanket must function for months without risk of loss of integrity in order to guarantee the functional reliability of the rotary presses. Now a thin film alone, of a thickness comparable to that of steel, that is to say of 0.2 to 0.3 mm, is in itself not strong enough, and a thicker film would become fragile in the zone of bending, with cracking and tendency to fracture.

The multilayer blankets proposed by the invention, on the other hand, make it possible to keep the pliability of a thin band, to provide increased mechanical reliability by addition of material, and to retain its shape memory without generating structural weakness in the zone of bending.

It emerges from the different examples of embodiment of the invention that the part of the blanket intended for use as means of attachment replacing the known steel band, that is to say the leading and trailing edges, can have:

- a film of polyester or polycarbonate type or equivalent associated with a unidirectional reinforcement of aramid or polyethylene type embedded in a matrix of polymer or polymer reinforced with fibers;
- a film of polyester or polycarbonate type associated with a reinforcement of woven or non-woven type with fibers of polyester or aramid or polyamide or polyethylene or else of metal embedded in a matrix of polymer;
- an association of two films of identical or different nature with an intermediate layer made of polymer, forming an encasing structure;
- an association of two films of identical or different nature with an intermediate layer made of polymer associated with unidirectional reinforcements of the aramid or polyethylene type or reinforced by fibers;
- an association of two films with a compressible intermediate layer, forming an encasing structure;
- an association of two films with a compressible intermediate layer associated with unidirectional reinforcements of the aramid or polyethylene type, forming an encasing structure.

The order of the layers can be any order, and could be the object of an optimization choice. A protective layer on the surface opposite from the printing surface can be added in order to mechanically protect the cylinder of the machine and the fixing layers and to fill in the space if necessary. It should be noted that the reinforcement is preferably set between two films and embedded in a polymer matrix.

It is advantageous to bend the blanket in the hot state in order to aid in shaping it and in order to retain its shape memory after bending and cooling. The bending can be done by known machines already used for bending offset plates. In these machines, the blankets to be bent in the form of a leading edge and a trailing edge are successively introduced into a suitable gap up to a mechanical stop. The machine automatically bends the blanket held in position by the operator. Two types of bending are considered according to whether it pertains to the leading edge or to the trailing edge.

It should also be noted that the filler polymer or the polymer matrix to be used in the context of the invention could usefully have a glass transition temperature higher than room temperature in order to help the shape memory in case of bending the ends with heat. As shown in FIG. 2, it could be advantageous to provide an dissymmetry between the geometry of the leading edge and the trailing edge. The leading edge, which is stressed to a greater degree, could be thicker and reinforced by any known means in comparison with the trailing edge, which could be thinner, the aim being to further reduce the zone of the non-printing gap and which generates vibrations.

As an example, the total thickness of a blanket according to the invention could be between 1.00 mm and 3.30 mm, the thicknesses of the envisaged films between 50 and 250 microns, the thicknesses of the connecting polymer layers between 0.10 and 0.5 mm, and the thicknesses of the zones of fixation according to the invention between 0.25 and 0.70 mm.

Concerning the nature of the materials, the films could be of the polyester, polybutylene terephthalate (PBT), polycarbonate, and polypropylene type. As the polymer, it would be possible advantageously to use thermoplastic material such as polyurethane (TPU), polyesters, polyethylene, extruded elastomers, extruded elastomers reinforced with short fibers or polyamides. Concerning the fibers, fibers of polyester, aramid, polyamide, polyethylene, glass, carbon or steel are advantageously used. As an associated blanket, one advantageously uses traditional rubber, with compressible layer, made with fabric reinforcement and polymer technology.

The invention claimed is:

1. A printing blanket intended for mounting on a rotating supporting cylinder of a printing machine, which comprises a composite structure having, from the exterior to the interior juxtapose to the cylinder, a printing layer, a fabric layer, a compressible layer, multilayers having a leading edge and a trailing edge, and a protective layer, wherein the protective layer is interior of the leading and trailing edges, said protective layer is adapted for direct contact with the supporting cylinder, said leading edge and said trailing edge adapted for engagement in an axial fixing gap of the supporting cylinder, the trailing and leading edges having a smaller thickness than the combination of the printing layer, fabric layer, and compressible layer, each of said leading edge and trailing edge being longer in the rotating direction of the cylinder than said printing layer, fabric layer, compressible layer, and protective layer.

2. The printing blanket of claim 1, wherein the leading edge and the trailing edge have the same multilayers.

3. The printing blanket of claim 1, wherein the trailing edge is thin in comparison with the leading edge.

4. The printing blanket of claim 1, wherein the composite structure includes a film beneath the compressible layer with unidirectional reinforcement of aramid or polyethylene embedded in the film.

5. The printing blanket of claim 1, wherein the composite structure includes a film and a woven or non-woven reinforcement with fibers of polyester, aramid, polyamide, polyethylene, or metal embedded in the film beneath the compressible layer.

6. The printing blanket of claim 1 wherein the composite structure includes two films with an intermediate layer to form an encasing structure beneath the compressible layer.

7. The printing blanket of claim 1, wherein the composite structure includes two films with an intermediate polyester layer and unidirectional reinforcements of aramid, polyethylene, or reinforced by fibers beneath the compressible layer.

8. The printing blanket of claim 7, wherein the intermediate layer is a compressible intermediate layer.

9. The printing blanket of claim 7, wherein the intermediate layer is a filler layer associated with unidirectional reinforcements of aramid or polyethylene to form the encasing structure.

10. The printing blanket of claim 1, wherein the blanket has a filler layer of a grindable polymer material beneath the compressible layer.

11. The printing blanket of claim 4, wherein the film includes polyester or polycarbonate.

12. The printing blanket of claim 6, wherein the films includes polyester or polycarbonate.

13. The printing blanket of claim 12, wherein the two films are identical.

* * * * *